United States Patent [19]

Lief

[11] 3,904,750

[45] Sept. 9, 1975

[54] PARAINFLUENZA VIRUS VACCINE FOR THE CONTROL OF CANINE TRACHEO-BRONCHITIS (KENNEL COUGH)

[75] Inventor: Florence S. Lief, Bala Cynwyd, Pa.

[73] Assignee: The Trustees of the University of Pennsylvania, Philadelphia, Pa.

[22] Filed: Dec. 18, 1974

[21] Appl. No.: 533,794

Related U.S. Application Data

[63] Continuation-in-part of Ser. No. 440,015, Feb. 6, 1974, abandoned.

[52] U.S. Cl. .................. 424/89; 195/1.1; 195/1.3; 195/1.8
[51] Int. Cl.$^2$........................................ C12K 7/00
[58] Field of Search ..................................... 424/89; 195/1.1–1.8

[56] References Cited
OTHER PUBLICATIONS

Wright et al., J. Small Anim. Pract., 15(1): 27–35 Jan. 1974, "Canine Respiratory Virus Infections."
O'Brien et al., Amer. Anim. Hosp. Ass. Proc., 38: 178–179 (1971), "Current Concepts in Respiratory Disease Dogs."
Goodwin et al., Curr. Vet. Therap., 4: 643–644 (1971), "Upper Respiratory Viral Diseases of the Dog."
Binn et al., Amer. J. Vet. Res., 31(4): 697–702 Apr. 1970, "Viral Antibody Patterns in Laboratory Dogs with Respiratory Disease."
Tribe et al., J. Small Anim. Pract., 14(5): 251–255 May 1973, "Protection of Dogs Against Canine Hepatitis with Toronto A26/61 Virus (Kennel Cough Isolate) Hexon Antigen."
Appel et al., Amer. Vet. Med. Ass. J., 156(12, pt.1): 1778–1781, June 15, 1970, "SV-5-Like Parainfluenza Virus in Dogs."
Binn et al., Amer. Vet. Med. Ass. J., 156(12,Pt. 1): 1774–1777, June 15, 1970, "Comments on Epizootiology of Parainfluenza SV-5 in Dogs."
Bittle et al., Amer. Vet. Med. Ass. J., 156(12, Pt.1): 1771–1773, June 15, 1970, "The Epizootiology of Canine Parainfluenza."

*Primary Examiner*—Shep K. Rose
*Attorney, Agent, or Firm*—Paul & Paul

[57] ABSTRACT

A kennel cough vaccine, prepared by passaging an $SV_5$-like parainfluenza virus in Madin Darby Canine Kidney cells, is described as being effective in inducing immunity to canine tracheobronchitis (kennel cough).

25 Claims, No Drawings

PARAINFLUENZA VIRUS VACCINE FOR THE CONTROL OF CANINE TRACHEO-BRONCHITIS (KENNEL COUGH)

RELATED CASE

This application is a continuation-in-part of my copending application Ser. No. 440,015, filed Feb. 6, 1974, now abandoned.

This invention relates to the manufacture and administration of a parainfluenza live-virus vaccine which is capable of inducing immunity to canine tracheobronchitis (commonly known as "kennel cough").

BACKGROUND OF THE INVENTION

Respiratory disease among closed populations of dogs assembled in kennels and other similar facilities is quite common. In one dog population, for example, respiratory infections accounted for the deaths of more than half of those dogs admitted for a six week stay in the facility. While several viruses have been implicated as the cause of the disease, recently a single $SV_5$-like parainfluenza virus has been isolated from diseased dogs throughout the United States. Table I gives some indication of the nature of populations and extent of geographical dissemination of this virus. Tables II and III show that $SV_5$-like canine parainfluenza isolates from distant origins are antigenically identical. Although other viruses such as canine distemper, ICH and the related adenovirus, A/Toronto 26 and occasionally a herpes virus, are capable of producing respiratory disease signs which are clinically difficult to differentiate from the parainfluenza virus induced disease, the evidence suggests that this parainfluenza virus is a significant cause of kennel cough, particularly since ICH and canine distemper vaccines are available.

Research has indicated that this $SV_5$-like parainfluenza virus can establish infection in virtually 100% of dogs without preexisting antibody, that once infected, the disease can be transmitted by contact to other antibody-free dogs in series, and that recovered dogs challenged by the same virus two and one half months later are resistant to reinfection. These results are substantiated by field studies which indicate that the $SV_5$-like parainfluenza virus is a more efficient spreader than other viruses causing similar respiratory symptoms, and that natural outbreaks of kennel cough render the surviving animals uniformly immune to similar parainfluenza infection. Tables IV and V give information collected by the inventor and her colleagues in the study of a spontaneous outbreak of respiratory disease among laboratory dogs at the University of Pennsylvania. These data reveal a much higher rate of parainfluenza infection than adenovirus infection having similar disease characteristics. Table VI demonstrates resistance to disease on natural challenge of dogs which recovered from the parainfluenza infection. Table VII illustrates immunity which developed in dogs following infection in nature or experimental exposure as revealed by their failure to shed virus or become ill on experimental challenge with a virulent strain of the virus.

TABLE I

Reports of Isolation of an SV5-like Parainfluenza Virus from Epizootics of Canine Respiratory Disease

| Location | Population | Publication |
|---|---|---|
| Washington, D.C. | Laboratory Dogs | Binn et al. Proc. Soc. Exp. Biol. and Med., 126:140, 1967 |
| Lackland AFB, Texas | Sentry Dogs | Crandell et al. Am.J.Vet.Res. 29:2141, 1968 |
| Ft. Benning, Ga. | Military Dogs | Binn et al. Am.J.Vet.Res. 29:1809, 1968 |
| New York and New Jersey | Pet Shop and Kennel Dogs | Appel and Percy. J. A.V.M.A. 156:1778, 1969 |
| New Jersey | Urban Pets | " |
| Ithaca, N.Y. | Cornell Dog Farm | " |
| Philadelphia, Pa. | Animal Hospital Dogs | Rosenberg, et al. Am.J. Epid. 94:147, 1971 |
| Quakertown, Pa. | Laboratory Dogs Kennel Dogs | Lief and Rosenberg, Unpub'd. |
| Dublin, Va. | Breeding Kennel Flow Laboratory Dog Facility | Lief, Unpub'd. |

TABLE II

Results of Reciprocal Neutralization Tests on Some Canine Parainfluenza Isolates from Different Sources

| | | | | Titers with Isolate No. | | | |
|---|---|---|---|---|---|---|---|
| | | | | ATCC VR 666 | | | |
| Source | Dog No. Serum* | Penn/343 | Penn/406 | Penn/103 | Penn/268 | Penn/121 | Binn's C95833 |
| U. of P. Vet. Hosp. (1967) | Penn/343 | 128 | | | 64 | | |
| Quakertown, Pa. Kennel (May 1970) | Penn/406 | 8–16 | 16 | | 16 | | |
| U. of P. Lab. (July 1970) | Penn/103 (ATCC VR 666) | 16 | | 16 | 16 | | |
| | Penn/268 | 64 | | 64 | 128 | 64 | 64 |
| | Penn/121 | 128 | | 128 | 128 | 64 | |
| Walter Reed | C 95833 (Binn) | 128 | | | | | 128 |

*Convalescent

TABLE III

Antigenic Analysis by H-I of Viruses Recovered from Mongrel Dogs in Virginia and Pennsylvania

| Isolate No. | H-I Titers with Penn/343 Serum |
|---|---|
| Va/7527 | 32 |
| Va/7526 | 32 |
| Va/7522 | 32 |
| Penn/343 | 32–64 |
| Penn/103, ATCC VR 666 | 64 |

TABLE VI

Results of Natural Challenge of Dogs Recovered from the Laboratory Epizootic

| Virus | Previous Exposure (a) | No. Dogs | No. Isolations on Challenge P.I. | Adeno | Illness |
|---|---|---|---|---|---|
| Para-influenza | + | 18 | 0 | 8 | – |
|  | – | 6 | 3(50%) | 2 | + |
| Adeno | + | 20 | 3 | 6(30%) | + |
|  | – | 4 | 0 | 4(100%) | – |
| Totals |  | 24 | 3(b) | 10(b) | 3 |

(a) Includes animals with antibodies before start of laboratory epizootic.
(b) The 13 virus isolations were made from different dogs. No double infections were encountered.

TABLE IV

Parainfluenza and Adenovirus Infections in an Epizootic Among Laboratory Dogs at the University of Pennsylvania

| Dog No. | Virus Isol. PI | Adeno | H-I Antibody Rises PI | Adeno(a) | Illness(b) | Deaths after Admission |
|---|---|---|---|---|---|---|
| 102 | + |  | 0/64(c) | 0/0 | ± |  |
| 103 | + |  | 0/64 | 0/0 | ± |  |
| 104 |  |  | 0/0 | 0/0 | + |  |
| 115 | + |  | 0/128 | 0/0 | + |  |
| 119 | + |  | 0/16 | 8/8 | + |  |
| 121 | + |  | 0/256 | 16/8 | + |  |
| 178 | + |  | 0/128 | 32/16 | + |  |
| 216 |  |  | 0/0 | 16/8 | + |  |
| 224 |  |  | 0/ND | 0/ND | + | Died in two weeks |
| 268 | + |  | 0/256 | 64/32 | + |  |
| 292 | + |  | 0/256 | 8/8 |  |  |
| 294 | + | + | 0/128 | 16/128 | ± |  |
| 396 |  |  | 0/0 | 16/0 |  |  |
| 405 | + |  | 0/64 | 64/64 | + |  |
| 411 |  | + | 0/0 | 0/128(d) | + |  |
| 412 |  | + | 0/ND | 0/ND | + | Euthanized one week |
| 413 | + |  | 0/ND | 0/ND | Fever only | Died in one week |
| 423 | + | + | 0/64 | 0/64 | ± |  |
| 424 | + |  | 8/16 | 16/16 | + |  |
| 426 |  |  | 0/0 | 16/16 | + | Died in five weeks |
| 575 | + |  | 0/128 | 16/8 | + |  |
| 655 |  |  | 0/8 | 16/8 |  |  |
| 667 |  |  | 256/256 | 16/8 |  |  |
| 699 |  |  | 256/32 | 64/8 |  |  |
| 700 |  |  | 0/0 | 64/16 |  |  |
| 701 |  |  | 64/64 | 64/32 |  |  |
| 818 | + |  | 0/64 | 8/128 | ± |  |
| 824 |  |  | 0/0 | 512/256 |  |  |
| Totals | 15/28 (54%) | 4/28 (14%) | 15/28 (54%) | 3/28 (10%) | 20/28 (71%) | 4/28 (14%) |

(a) against virus isolated from No. 294
(b) ± = mild URI; + = more severe signs
(c) 0 = < 1:8
(d) against ICH only

TABLE V

Incidence of Parainfluenza and Adenovirus Infections in an Epizootic of Respiratory Disease Among Laboratory Dogs

| Virus | Pre-existing Antibodies | No. Dogs | No. Dogs With Rises | No. Virus Isolations | No. with Rises or Isolations | No. Ill with Virus Isolations or Antibody Rises | Total Illness |
|---|---|---|---|---|---|---|---|
| Para-influenza | None | 24 | 15[a] (62%) | 15 (62%) | 16 (67%) | 14/16 (87%) | 14 (58%) |
|  | ≥ 1:8 | 4 | 0 | 0 | 0 | 0 | 0 |
|  | Total | 28 | 15 (54%) | 15 (54%) | 15 (57%) | 14/16 (87%) | 14 (50%) |
| Adeno | None | 9 | 2[b] (22%) | 3 (33%) | 3 (33%) | 3/3 (100%) | 3 (33%) |
|  | ≥ 1:8 | 19 | 1 (2%) | 1 (2%) | 1 (2%) | 1/1 (100%) | 1 (2%) |
|  | Total | 28 | 3 (10%) | 4 (14%) | 4 (14%) | 4/4 (100%) | 4 (14%) |
| None Identified |  | 28 |  |  |  |  | 2 (7%) |

[a] No convalescent serum became available from a dog which shed virus and died. However another dog sustained an antibody rise but no virus was isolated from him.

[b] No convalescent serum obtained from one dog which shed virus and died.

TABLE VII

Resistance to Experimental Challenge with Penn/343/67 Canine Parainfluenza Virus of Dogs Previously Infected in Nature or Experimentally with the Same Virus

| Previous History | No. Dogs | Pre-existing Serum Antibody | Reaction to Challenge | | |
|---|---|---|---|---|---|
| | | | No. Shedding Virus | No. Ill | No. with Serum Antibody Rises |
| Natural Exposure | 7 | + (G.M.=1:114) | 0 | 0 | 1 |
| Experimental Exposure | 6 | + (G.M.=1:89) | 0 | 0 | 5[a] |
| Negative | 21 | — | 21 | 13[a] | 21 |

[a]Respiratory symptoms confirmed by positive radiologic and/or histopathologic findings.
[b]Pre-existing titers were low enough to show booster responses to viral antigen introduced into nose and throat even without multiplication.

SUMMARY OF INVENTION

This invention provides a live-virus $SV_5$-like canine parainfluenza vaccine which can be stored for many months at 4°C. in its lyophilized form. This vaccine has been found to be safe and immunogenic and capable, under field conditions, of limiting and controlling kennel cough. Intramuscular administration is presently preferred. Vaccinees suffer no side effects and rarely if ever excrete virus when this route is used. Furthermore, on giving the vaccine by the natural route (into the nose and throat) although they shed virus for about one week, none of the animals or their contacts become ill. (Table VIII) The use of a continuous mammalian kidney cell line, such as Madin Darby Canine Kidney (MDCK) cell cultures, for the original isolation of the strain, for its successive passage and in the manufacture of the vaccine excludes the likelihood of latent viruses being transmitted to the vaccinee through the vaccine. Furthermore, the use of a virus vaccine for immunization of canines, which has been grown in cell cultures derived from the same species, excludes the possibility of the induction of allergic or hypersensitive reactions in the vaccinees. Field tests indicate that the use of this vaccine can result in a 64% reduction in the death rate of a closed population of dogs formerly susceptible to outbreaks of kennel cough.

According to the present invention, a strain of the $SV_5$-like canine virus is isolated and serially passaged in MDCK cell cultures at least five times in order to produce a non-pathogenic live-virus vaccine which is capable of producing immunity when administered by either the natural route or parenterally. Antigenically it is indistinguishable from the pathogenic $SV_5$-like canine parainfluenza virus (Penn/343/67) described in Rosenberg FJ, Lief FS, Todd JD, and Rief JS, "Studies of Canine Respiratory Viruses. I. Experimental Infection of Dogs with an $SV_5$-like Canine Parainfluenza Agent", AM. J. of Epidemiology 94: 147 (1971) or from isolates obtained from other epizootics by the inventor or other investigators (Appel, M., Pickerill, P. H., Menegus, M., Percy, D. H., Parsonon, I. M., and Sheffy, B. E. Current Status of Canine Respiratory Disease. 20th Gaines Vet. Symposium, Manhattan, Kansas College Vet. Med., K.S.U. *Newer Knowledge About Dogs*. Oct. 22, 1970, pp. 15-23). A vaccine strain at the fifth passage level (Penn/103/70) has been deposited with the American Type Culture Collection (ATCC) which has assigned it the designation ATCC VR 666. During the term of this patent, it may be obtained from the collection by anyone. It was initially isolated in MDCK cells and multiplied to high titers on subpassage in these cells. Vaccine prepared from this strain was found to be safe and caused resistance to natural challenge under field conditions.

The canine parainfluenza virus is cultivated for the vaccine by successively passing the original isolate in MDCK cells employing as seed, infected supernatant fluids harvested from the previous passage. The inoculated cultures are incubated at each passage in the stationary position for a period of 6 to 7 days at a temperature of 36°.

Propagation of the MDCK cells may be carried out by any of the standard methods described in the literature. A tissue culture system comprising Eagle's minimal essential medium in Earle's buffered salt solution, with the addition of 10% fetal calf serum, 100 units of penicillin and 100 mcg of streptomycin per ml is one of the recommended standard techniques for growing MDCK cultures. For maintenance of the cultures, 2% calf serum is preferred. Before inoculation with virus the MDCK cell layers should be washed with Medium 199 supplemented with the above antibiotics. Following inoculation with virus, the cultures should be maintained in the same Medium with the addition of stabilizers as 0.1X SPG and 0.5% gelatin. It is to be understood that in referring to physiologic solutions, the letter "X" is known to refer to the concentration of the physiologic solution in question. It is common for physiologic solutions of the general type of SPG to be supplied in the 10X form, meaning that the solution is to be diluted to one-tenth of its strength, of 1X, in order to provide a solution having constituents, each of which is present in the desired balanced amounts.

For preparation of the vaccine, virus in the supernatant to which the stabilizers have been added (1X SPG and 0.5% gelatin) as well as intracellular virus released through a series of rapid freeze-thaw cycles is used. The resulting suspension is centrifuged at 3000 RPM for 10 minutes to remove cellular debris. This resultant clarified supernatant represents the final vaccine product which must be stored at −75° to −85°C. until needed. This final product usually has an HA titer of 1:128 to 1:256 when tested with guinea pig erythrocytes and a $TCD_{50}$ of $10^{6.7-7.7}$ per milliliter when titrated in MDCK cell cultures.

Due to the instability of the vaccine at temperatures above −70°C., a method of lyophilization is provided as a suitable means of preserving the vaccine for a long period of time at refrigerator temperatures. Preparation of this lyophilized product entails one less freeze-thaw cycle prior to clarification than for the aqueous product. On resuspension in the appropriate diluent, such as water (pH 7.0), the lyophilized product was found to have HA and infectivity titers commensurate with that observed for the aqueous product.

TABLE VIII

Results in Dogs Given PI 103 Vaccine[a] by the
Naso-Pharyngeal Route and in Dogs Exposed to Them

|  | Total No. | No. with Clinical Reaction[b] | No. Shedding Virus | No. with Pre-existing Antibody | No. with Sero Conversion |
|---|---|---|---|---|---|
| Inoculated Dogs (Given 0.5 ml into each nostril and 1 ml by spray into throat) | 9 | 0 | 9[c] | 0 | 9 Range=1:128– 1:256[e] |
| Contact Dogs (Introduced to inoculated dogs on 4th PID)[d] | 8 | 0 | 8[c] | 0 | 8 Range=1:64– 1:256[e] |
| Control Dogs (Isolated from inoculated and contact dogs) | 2 | 0 | 0 | 0 | 0 |

[a]Vaccine contained $10^{6.7}$ TCD$_{50}$ per ml.
[b]Fever or runny nose or conjunctivitis or spontaneous cough.
[c]Began 2 days after inoculation or exposure to inoculated dogs and lasted about 1 week.
[d]PID=Post-Inoculation Day.
[e]Serum Neutralizing Antibody Titer.

PREFERRED EMBODIMENT

Preparation of the final aqueous product is accomplished in two phases. First a seed virus for the vaccine is prepared by subpassing the isolate in MDCK cells four times using an incubation period of 6 to 7 days at 36°, a period which was found to produce the peak infectivity titers. To each harvest and especially to that of the passage to be used as seed virus for vaccine preparation stabilizers are added before each is divided into small aliquots and frozen at less than −70°C. until needed. The stabilizer, SPG, is added to give a final concentration of 1X according to the method described by Bovarnick, et al, "The Influence of Certain Salts, Amino Acids, Sugars and Proteins on a Stability of Rickettsiae", J. Bact. 89:509–522 (1950) and sterile gelatin is added to give a final concentration of 0.5%. For convenience, harvests of initial serial passages may be frozen and repassed at a later time to form additional seed virus stocks for vaccine production. These seed stocks, which represent supernatant fluids from infected cells, usually have a hemagglutination (HA) titer with guinea pig red cells of 1:64 and an infectivity titer (TCD$_{50}$) of $10^{6.7-7.7}$ per milliliter.

In the second phase of vaccine production, virus is propagated in MDCK cells grown in 32 ounce bottles or in roller tubes using a seed virus which has undergone at least 4–5 passages. Before inoculation with the virus, the growth medium is removed and cells are washed twice with Medium 199 containing 100 u penicillin and 50 ug streptomycin per milliliter. A volume of $10^{-2}$ dilution of seed virus in Medium 199 containing the antibiotics and 0.1X SPG and 0.5% gelatin is introduced into the bottles or tubes in sufficient quantities to cover the cell monolayers. The cultures are then returned to the incubator for one hour. Roller tubes returned to the roller drum need no later rocking but bottles incubated in the stationary position require rocking at 15 minute intervals. At the end of the hour, Medium 199 containing antibiotics and stabilizers is added to the inoculated cultures in volumes appropriate for the particular container. The inoculated cultures are incubated for 6 to 7 days. The pH is monitored and excessive acidity controlled by the addition of a small amount of fresh medium to maintain a pH between 7 and 7.2. Such an addition is rarely required.

At the conclusion of this incubation, sterile gelatin to give a final concentration of 0.5% and SPG to give a final concentration of 1.0X is introduced into each vessel. The cultures are then immediately frozen at −70° to −85°C. and, again for the sake of convenience, may be stored at this temperature until the final vaccine product is made.

The final vaccine is produced by subjecting the frozen cultures to a total of 1 to 2 freeze-thaw cycles in order to release intracellular virus. The resulting fluid cell suspensions from each container may be pooled and the pools then should be centrifuged at 3,000 rpm for ten minutes. The clarified supernatant fluid represents the final aqueous product. It should be immediately distributed in desired volumes in appropriately sealed vials and immediately stored at −75° to −85°C. The final product will have an HA titer of 1:128 to 1:256 when tested with guinea pig erythrocytes, and a TCD$_{50}$ of $10^{6.7-7.7}$ per milliliter when titrated in MDCK cell cultures.

Because of the relative instability of the vaccine when stored at temperatures higher than −70°C., a method of lyophilization was developed to provide a practical means of preserving the vaccine. Table IX demonstrates the instability of the aqueous product when stored at −20°C., the temperature of an ordinary freezer. Lyophilization appears to have no adverse affect on infectivity. Tests indicate that the lyophilized product can be stored at least eight months at 4° without any infectivity losses. See Table X. After resuspension, the infectivity stability is the same as that of the aqueous vaccine. See Table XI. Preparation of the lyophilized product utilizes a single cycle of freezing and thawing of cells and fluid prior to centrifugation. Centrifugation and clarification are accomplished as before and the resulting supernatant then should be immediately lyophilized in 2 to 10 ml. volumes. The lyophilized product may be stored at 4° until needed. The resuspended product should be used immediately.

TABLE IX

Stability of ATCC VR 666 Vaccine Stored at Different Temperatures

| Temp. of Storage | Length of Storage | TCD50 per 0.2ml | Log 10 Change |
|---|---|---|---|
| −75°C | 5 days | $10^7$ | 0 |
|  | 7 months | $10^7$ | 0 |
| −20°C | 1 month | $10^{5.5}$ | −1.5 |
|  | 2½ months | $10^{4.5}$ | −2.5 |
|  | 4 months | $<10^1 - 10^1$ | −3 to −7 |
|  | 5 months | $<10^1 - 10^1$ | −3 to −7 |
|  | 7 months | $<10^1 - 10^1$ | −3 to −7 |

TABLE X

Stability of Lyophilized ATCC VR 666 Vaccine at 4°C

| Vaccine | Storage Time | TCD50 per ml | Change |
|---|---|---|---|
| Original Liquid | 0 | $10^{6.7}$ | 0 |
| Lyophil kept at 4°C | 1 week | $10^{6.7}$ | 0 |
| " | 1 month | $10^{6.7}$ | 0 |
| " | 5 months | $10^{6.7}$ | 0 |
| " | 8 months | $10^{6.7}$ | 0 |

TABLE XI

Instability of Lyophilized Vaccine After Resuspension and Storage at 4°C

| Preparation | Storage Time | Change in TCD50* |
|---|---|---|
| Resuspended Lyophilized Vaccine Stored at 4°C | < 1 day | 0 |
|  | 2–14 days | − 1 log |
|  | 1 month | − 2 logs |
|  | 2 months | − 3 logs |

*These changes are the same as occur with fresh harvests of this virus stored at 4°C.

TESTING OF VACCINE

Example 1

An extensive series of trials was performed at Flow Laboratories Research Animal Facilities in a large kennel which specilizes in supplying conditioned mongrel dogs for research purposes. This kennel had experienced continuous outbreaks of respiratory disease. It contained a population ranging from 500 to 800 animals at all times, 60 to 100 new dogs being admitted weekly. All incoming dogs were immediately vaccinated against canine distemper, hepatitis, leptospirosis and rabies in addition to deworming, clipping, dipping, etc. Only dogs in apparently good health were admitted. It was estimated that 10% of the total population died weekly because of respiratory disease. These deaths meant that more than 50% of the dogs admitted weekly would not survive their six to eight week stay.

In the first trial, two groups of newly admitted mongrel dogs comprising 31 animals were segregated from the rest of the population and given the aqueous vaccine which had been stored at −75°C. and contained $10^7$ $TCD_{50}$ per milliliter. The dogs were administered one milliliter doses in both the right and left neck muscles. Seven to ten days after vaccination all but four of the dogs were introduced into the general population. Naso-Pharyngeal swabs for virus isolation were taken on days 0, 3, 7, 10 and 20. Blood samples for antibody assays were taken on the day of administration and four weeks after vaccination. All animals were followed for at least six weeks and the four which remained in isolation were retained for 15 months in order to study antibody persistence.

All of the animals remained well even in the face of natural challenge. None shed virus accept for one, from which virus was recovered on the seventh day only. See Table XII. Although no dogs had had detectable circulating antibodies on admission to the study, four weeks after vaccination 29 of the 31 showed sero-conversion, with a mean H-I titer of 1:55. Neutralizing antibodies which appear later than H-I antibodies had a mean of 1:78 at this time. See Table XIII. Neutralizing antibodies developed and persisted at high titers in all four dogs kept for 15 months. Their H-I antibodies, on the other hand, although still present at 15 months, declined 2 to 4 fold from the one month level. See Table XIV.

Example 2

Using the same facilities as in Example 1, a total of 38 dogs were inoculated with a vaccine which contained $10^{6.7}$ $TCD_{50}$ per milliliter. Twenty of those dogs were inoculated intramuscularly and the remaining 18 dogs were inoculated subcutaneously in the neck region. The rate and level of sero-conversion for both routes were about the same as found in the first trial (Table XV). Thus, it appears that the vaccine is equally capable of stimulating circulating antibodies when given intramuscularly or subcutaneously.

TABLE XII

Illness and Virus Excretion in Dogs Given ATCC VR 666 Vaccine Stored Frozen at −75°C

| Dose and Route | No. Dogs | No. Ill | No. Excreting Virus on Days After Vaccination | | | | | Total No. Excreting |
|---|---|---|---|---|---|---|---|---|
|  |  |  | Day 0 | Day 3 | Day 7 | Day 10 | Day 20 |  |
| 2 × $10^7$TCD50 intramuscularly | 31 | 0 | 0 | 0 | 1 | 0 | 0 | 1/31/ (3%) |

TABLE XIII

Antibody Responses of Dogs to ATCC VR 666 Vaccine Stored Frozen at −75°C

| Dose and Route | No. Dogs | H-I Titers | | | Neutralizing Titers | | |
|---|---|---|---|---|---|---|---|
| | | No. Converting | Median | Mean[a] | No. Converting | Median | Mean |
| 2×10$^7$ TCD50 intramuscularly | 31 | 29/31 (93%) | <8/64[a] | <8/55 | 25/29[c] (86%) | <8/64 | <8/7 |

[a] Numerator = prevaccination and denominator = postvaccination titers
[b] Of positive responders
[c] Two dogs not tested

TABLE XIV

Persistence of Antibodies in Dogs Given ATCC VR 666 Vaccine, Stored Frozen at −75°C

| Dose and Route | Dog No. | H-I Titers | | | | | | Neut. Titers | | | | |
|---|---|---|---|---|---|---|---|---|---|---|---|---|
| | | 1 day | 1 mo. | 2 mos | 6 mos | 9 mos | 15 mos | 0 day | 1 mo. | 2 mos. | 6 mos. | 9 mos. | 15 mos. |
| 2×10$^7$ TCD50 intramuscularly | 4655 | <8 | 128 | 64 | 32 | 32 | 32 | <8 | 256 | 128 | 256 | 256 | 128 |
| | 4662 | <8 | 128 | 64 | 32 | 64 | 64 | <8 | 32 | 128 | 256 | 128 | 256 |
| | 4679 | <8 | 64 | | 32 | 32 | 32 | <8 | 32 | | 64 | 64 | 64 |
| | 4684 | <8 | 64 | 32 | 32 | 64 | 64 | <8 | <16 | 16 | 128 | 128 | 128 |
| | 4656 | <8 | 16 | 32 | | | | <8 | 64 | 64 | | | |

TABLE XV

H-I Antibody Responses of Dogs to ATCC VR 666 Vaccine Stored Frozen at −75°C and Given by Different Routes

| Dose and Route | Total No. Dogs | No. Showing Sero conversion | PreTiters G.M. | PreTiters Range | Post-Titers G.M.* | Post-Titers Range |
|---|---|---|---|---|---|---|
| 2 × 10$^{6.7}$ TCD50 intramuscularly | 20 | 17 (85%) | <8 | <8 | 64 | 16–512 |
| 2 × 10$^{6.7}$ TCD50 subcutaneously | 18 | 17 (94%) | <8 | <8 | 51 | 8–512 |

*Of positive responders

Example 3

In this trial, an attempt was made to correlate infectivity losses due to high storage temperatures with immunogenicity. Nine dogs were inoculated intramuscularly with aqueous vaccines stored at −75°C., nine with the same vaccine lot stored at −20°C. and 10 with the same vaccine lot stored at 4°C. Table XVI shows there is a direct correlation between the level of antibody response and the amount of live virus remaining in the vaccine. The highest titers were obtained with the −75°C. stored preparation and the lowest with the 4°C. stored material.

A similar assay was carried out with lyophilized vaccine, to compare its immunogenicity with that of aqueous vaccines properly stored at −75°C. Twenty-nine dogs were given 2 milliliters intramuscularly of a resuspended preparation containing 10$^{6.7}$ TCD$_{50}$ per milliliter, and it became clear that the antibody responses were very similar to that induced by vaccines stored at −75°C. See Table XVII.

Example 4

Beginning in the middle of February 1970, all new arrivals to the mongrel dog colony were inoculated intramuscularly as described above with 2 milliliters of the ATCC VR 666 vaccine which was kept at −75°C. Since it was known that antibodies to this virus could be detected as early as the eighth day after exposure, the newly vaccinated dogs were kept apart for seven to 10 days before being introduced into the general population. This policy was followed until almost 100% of the population represented vaccinated animals. Thereafter, animals were introduced into the general population without the 7 to 10 day segregation period.

TABLE XVI

H-I Antibody Responses of Dogs to ATCC VR 666 Vaccine Stored at Different Temperatures for Five Months

| Storage Temp. | TCD50 per ml. | Dose and Route | No. Dogs | No. converting | H-I Titers Median | Mean |
|---|---|---|---|---|---|---|
| −75° | 10$^6$ | 2 ml intramusc. | 9 | 9 (100%) | <8/32* | <8/32 |
| −20° | 10$^{3.5}$ | " | 9 | 8 (89%) | <8/16 | <8/16 |
| +4°C | 10$^{1.0}$ | " | 10 | 9 (90%) | <8/8 | <8/13 |

*Numerator = prevaccination and denominator = postvaccination titers

TABLE XVII

Antibody Responses of Dogs to ATCC VR 666 Vaccine Lyophilized

| Dose and Route | No. Dogs | H-I Titers |  |  | Neutralizing Titers |  |  |
|---|---|---|---|---|---|---|---|
| | | No. converting | Median | Mean[b] | No. converting | Median | Mean |
| $2 \times 10^{6.7}$ TCD50 intramuscularly | 29 | 26 (90%) | <8/64[a] | <8/48 | 20 (70%)[c] | <8/16 | <8/83 |

[a] Numerator=prevaccination and denominator=postvaccination titers
[b] Of positive responders
[c] H-I antibodies appear before neutralizing antibodies. These sera were taken before neutralizing antibodies reach their peak.

As can be seen from Table XVIII, mortality rates for the five month period preceding the inception of the vaccination program revealed that when computed on a four week basis an average of 5.5 – 10.8% of the resident population succumbed each week to respiratory disease. As would be normal in a changing population of this kind there was considerable variation in the weekly death rate. Some weeks it reached as high as 14–16% after which it fell, probably due to the reduction of the number of susceptibles remaining. With the introduction of new susceptibles, this reduction was always followed by a marked increase in the weekly death rate.

The impact of the vaccinations did not become apparent until a majority of the dogs in the colony were vaccinated. In the week ending Mar. 24, 1971, 50% of the resident dogs consisted of vaccinated animals. The mortality rate per total population that week was 4%. As the percentage of vaccinated dogs increased the mortality rates continued to fall. By the time 70–100% of the dogs in the kennel were vaccinated, the weekly death rate was 2%. From Apr. 5 to May 8, 1971 no vaccine was available, and new unvaccinated dogs were admitted while vaccinated dogs were sold. During this period the mortality rates rose to 4.7% from a figure of 2.1% recorded the week before. Reinstitution of vaccinations immediately caused a fall in the death rate. Before the old rate of approximately 2% was reestablished, aqueous vaccine which had been stored at −20°C. was inadvertently administered. This error was discovered when it was noticed that more dogs were dying of respiratory disease and indeed there was an increase in the average weekly mortality rate. Resumption of inoculation with potent vaccine gradually forced the mortality rate to a low of between 0.4 and 1% which has persisted.

For an assessment of the overall mortality rates during the control and vaccinated periods see Tables XIX and XX. It can be seen that the weekly death rate for the control period was 7.4%. Even including the period when no vaccine was available the vaccination period death rate was 3.92%. Counting only that period when vaccine was available the death rate became 3.39%. Applying the $Chi^2$ test, p was less than 0.001. Table XXI illustrates the fact that these rates could be maintained with the use of lyophilized vaccine.

The utility of this vaccine in the prevention of kennel cough is best revealed by examining the death rates of dogs admitted to the kennel before and after inception of the vaccination with the ATCC VR 666 vaccine (See Tables XXII and XXIII). Of 1,980 dogs admitted from September to March 1971, 1,141 of these dogs died or were euthanized because of severe respiratory disease. After vaccination was instituted only 626 of the 2,391 dogs admitted during the next 9½ months died or where euthanized for the same reason. Instead of a death rate of 58%, during the vaccination period only 26% of the dogs succumbed to respiratory disease. In 1972 this death rate decreased even more, resulting in the survival of 79 dogs out of every 100 admitted, representing a decrease in mortality rate of 64%.

The loss of 20% of all incoming dogs to respiratory disease is still a problem. A number of other agents can mimic the symptoms of kennel cough. To some extent, this death rate may be explained by the admission of some animals which arrive preinfected, not only with canine parainfluenza virus but most likely with canine distemper, ICH and ICH-like viruses and probably bacterial agents as well. No vaccine can prevent these diseases from running their full course. However, the use of this canine parainfluenza virus vaccine in all incoming dogs clearly prevented the transmission of a major Weekly Mortality Rates in a Mongrel Dog Kennel During Control and Vaccinated Periods Using Frozen ATCC VR 666

| Interval | Total Dogs at Risk | No. Dead or Euth. for Illness | Vaccine Status | Average Weekly Mortality per Total Population |
|---|---|---|---|---|
| 9/16–10/13/70 | 2894 | 313 | 0 | 10.8 |
| 10/14–11/11/70 | 3015 | 203 | 0 | 6.7 |
| 12/10–1/6/71 | 2328 | 196 | 0 | 8.3 |
| 1/7 –2/3/71 | 2975 | 162 | 0 | 5.5 |
| 2/4 –2/17/71 | 1245 | 101 | 0 | 8.1 |
| | | Began vaccinations week of 2/10; 22 of 601 dogs vaccinated | | |
| 2/10–3/10/71 | 2268 | 166 | <10–40% | 7.3 |
| 3/11–4/7/71 | 2074 | 55 | gradually increased to 100% | 2.1 |
| 4/8 –5/5/71 | 2676 | 125 | no vaccine, gradually reduced to 40% | 4.7 |
| 5/6 –6/2/71 | 2930 | 133 | 40–80% | 4.5 |
| 6/3 –6/30/71 | 2429 | 166 | −20° C vaccine with low titer used in this period | 6.9 |
| 7/1 –7/28/71 | 2492 | 87 | 100% | 3.4 |
| 7/29–8/25/71 | 2589 | 31 | 100% | 1.1 |
| 8/26–9/22/71 | 2278 | 25 | 100% | 1.1 |
| 9/23–10/6/71 | 1049 | 4 | 100% | 0.4 | cause of respiratory infections to other residents in the kennel. There is no doubt too that this canine parainfluenza virus vaccine when prepared and administered as described is safe, immunogenic and efficacious in reducing mortalities associated with respiratory disease outbreaks occurring in kennels.

$$^{(c)}\text{Rate} = \frac{\text{Deaths}}{\text{Total Dog} - \text{Weeks of Risk}}$$

$^{(d)}$Includes - 4/7 to 5/19 when no vaccine was used and % of dogs in population vaccinated fell to 45 and 5/27 to 6/30 when low titer vaccine stored at −20° was used. During these periods some death increases were noted.
$^{(e)}P = < .001$

TABLE XIX

Average Weekly Mortality Rates per Total Population for Non-Vaccinated and Vaccinated Periods Using Frozen ATCC VR 666

| Time Period | Vaccine | Died | Survived$^{(a)}$ | Total$^{(b)}$ | Rate$^{(c)}$ |
|---|---|---|---|---|---|
| 9/16/70–2/11/71 | No | 885 | 10,961 | 11,846 | 7.47% |
| 2/10/71–4/7/71<br>5/20/71–10/6/71 | Yes | 559 | 15,952 | 16,511 | 3.39%$^{(d)}$ |

$^{(a)}$Total number dogs survived weekly
$^{(b)}$Total number dogs at risk weekly $$^{(c)}\text{Rate} = \frac{\text{Deaths}}{\text{Total Dog} - \text{Weeks of Risk}}$$

$^{(d)}P = < .001$

TABLE XXI

Weekly Mortality Rates After Beginning Vaccination with Lyophilized Preparation*

| Week | Total Population | No. Dogs Admitted | No. Dead or Euth. for Illness | % Mortality per Total Population |
|---|---|---|---|---|
| 2/15–2/21/73 | 222 | 40 | 4 | 1.8 |
| 2/22–2/28/73 | 243 | 48 | 3 | 1.2 |
| 2/29–3/7/73 | 253 | 45 | 8 | 3.1 |
| 3/8–3/14/73 | 255 | 44 | 0 | 0 |
| 3/15–3/21/73 | 273 | 47 | 2 | 0.8 |
| Total | 1246 | 224 | 17 | 1.3 |

*Beginning 2/12/73 new dogs were given $2 \times 10^{6.7}$ TCD50 intramuscularly of this preparation.

TABLE XX

Average Weekly Mortality Rates per Total Population for Non-Vaccinated and Vaccinated Periods Using Frozen ATCC VR 666

| Time Period | Vaccine | Died | Survived$^{(a)}$ | Total$^{(b)}$ | Rate$^{(c)}$ |
|---|---|---|---|---|---|
| 9/16/70–2/11/71 | No | 885 | 10,961 | 11,846 | 7.47% |
| 2/10/71–10/6/71$^{(d)}$ | Yes | 792 | 19,434 | 20,226 | 3.92%$^{(e)}$ |

$^{(a)}$Total number dogs survived weekly
$^{(b)}$Total number of dogs at risk weekly

TABLE XXII

Influence of Use of ATCC VR 666 Vaccine on the Mortality Rates per Dogs Admitted to the Mongrel Dog Colony

| Time Period | No. Dogs Admitted | Vaccine Status | No. Dead or Euthanized | Mortality Rate (%) |
|---|---|---|---|---|
| 9/16/70–3/10/71 | 1980 | None to 2/10/71 <10–<40% vaccinated 2/10–3/10 | 1141 | 57.6 |
| 3/11/71–4/7/71 | 346 | 100% vaccinated | 55 | 15.8 |
| 4/8/71–5/5/71 | 486 | No vaccine No. vaccinated gradually, reduced to 40% | 125 | 25.7 |
| 5/6/71–6/30/71 | 751 | Vaccinations resumed but −20°C vaccine mainly used | 299 | 39.6 |
| 7/1/71–10/6/71 | 808 | 100% vaccinated | 147 | 18.1 |

TABLE XXIII

Mortality Rates in Dogs Introduced into the Mongrel Dog Kennel During Control and Vaccinated Periods

| Control | No. Dogs Admitted | No. Dogs Dead or Euthanized | Rate (%) |
|---|---|---|---|
| 9/16/70–3/10/71 | 1980 | 1141 | 57.6 |
| Vaccinated 3/11/71–12/31/71 | 2391 | 626 | 26.1 |
| Vaccinated 1/1/71–12/31/71 | 3724 | 1014 | 27.2 |
| Vaccinated 1/1/72–12/31/72 | 2339 | 507 | 21.2 |

NOTE: Control period includes 2/10 - 3/10/71 when less than 40% of dogs were vaccinated. After vaccination with Pl 103 was instituted there were periods of time when no vaccine was available or vaccine inactivated by storage at −20°C was inadvertently used. During these periods, regardless of the time of the year, morbidity and mortality rates rose, but fell again as soon as vaccine with proper infectivity was reintroduced. (Table 17).

Example 5

This test was performed in another Flow Laboratories Research Animal Facilities kennel which was used for breeding and raising beagles. The total population of this kennel was about 500 dogs. Severe respiratory disease symptoms appeared chiefly in young puppies five to eight weeks old. Better than 50% of the young animals contracted the disease, and most of those who did contract the disease died. As in the first population, a parainfluenza agent similar to the proposed vaccine strain was recovered from these sick puppies, and a plan for inoculation of the puppies was formulated.

Due to a decision by Flow Laboratories to disband the beagle population within two months, the testing possibilities for the vaccine were severely curtailed. Between Feb. 19, and Apr. 10, 1971, 230 puppies ranging in age from five to seven weeks were vaccinated. They were given 1 milliliter of the vaccine divided equally and injected into the neck muscles. Ordinary mortality rates due to respiratory disease in this age group suggested that 50–60% of the dogs would have contracted the disease and died had they not been vaccinated. In the vaccinated group the mortality rate was 30%.

The shortened testing period considerably reduced the reliability of this test. Parainfluenza virus was isolated from some of the vaccinated dogs which died as well as from other nonvaccinated young dogs which were sick or dying from respiratory disease. Many of the vaccinated puppies which died may have succumbed to natural infection prior to vaccination. Although more extensive and better controlled studies are needed, preliminary data demonstrates that the canine parainfluenza tracheobronchitis vaccine shows practical utility in populations of this kind.

I claim:

1. A method of producing an aqueous canine tracheobronchitis vaccine comprising the step of serially passaging a $SV_5$-like canine tracheobronchitis virus strain in a continuous-line mammalian kidney cell culture free of extraneous agents to produce said aqueous canine tracheobronchitis vaccine.

2. A method in accordance with claim 1, comprising the additional step of first isolating said virus strain in said cell culture.

3. A method in accordance with claim 1, comprising the additional steps of increasing the virus yield by releasing the intracellular virus through rapid freeze-thaw cycles of said cell culture and centrifuging the resulting fluid-cell suspension at low speed to produce a clarified supernatant aqueous vaccine.

4. A method in accordance with claim 1, comprising (a) the additional steps of adding SPG to give a final concentration at 1X SPG and gelatin to give a final concentration at 0.5% gelatin to stabilize the HA and infectivity titers of the harvests of virus from said virus-containing cell culture; and (b) adding to the medium during propagation the virus-containing cell culture SPG to give a final concentration of 0.1X SPG and gelatin to give a final concentration of 0.5% gelatin to insure against inactivation during propagation.

5. A method in accordance with claim 1, wherein said virus strain is serially passaged at least five times in Madin Darby Canine Kidney Cells.

6. A method in accordance with claim 1, wherein said virus strain is Penn/103/70, ATCC VR 666.

7. A method in accordance with claim 5, wherein each passage is incubated at 36°C. for 6 to 7 days.

8. A method in accordance with claim 3, wherein one to two freeze-thaw cycles are used to release the virus particles from the cells.

9. A method of producing an aqueous canine tracheobronchitis vaccine comprising the steps of:
 1. first isolating and then serially passaging the canine tracheobronchitis virus strain designated ATCC VR 666 at least five times in Madin Darby Canine Kidney cell culture, each passage being incubated at 36°C. for 6 to 7 days;
 2. stabilizing the HA titer and infectivity titer by adding SPG to a final concentration of 1X SPG and gelatin to a final concentration of 0.5% gelatin for harvest of the virus strain and SPG to a final concentration of 0.1X SPG and gelatin to a final concentration of 0.5% gelatin for propagation of the virus strain;
 3. increasing the virus yield by releasing the intracellular virus through one to two rapid freeze-thaw cycles of said cell culture; and
 4. centrifuging the resulting fluid-cell suspension at low speed to produce a clarified supernatant aqueous vaccine.

10. A method of producing a lyophilized canine tracheobronchitis vaccine comprising the steps of:
 1. serially passaging an $SV_5$-like canine tracheobronchitis virus strain in a continuous-line mammalian kidney cell culture free of extraneous agents;
 2. at harvest of the virus strain from said cell culture, adding SPG to a final concentration of 1X SPG and gelatin to a final concentration of 0.5% gelatin, and during propagating of the virus strain adding SPG to a final concentration of 0.1X SPG and gelatin to a final concentration of 0.5% gelatin;
 3. increasing the virus yield by releasing the intracellular virus through rapid freeze-thaw cycles of said cell culture;
 4. centrifuging the resulting fluid cell suspension to produce a clarified virus containing supernatant;
 5. lyophilizing said supernatant;
 6. storing the lyophilized product at 4°C. until needed for use; and
 7. resuspending said product in an appropriate resuspending medium to obtain said lyophilized vaccine.

11. A method in accordance with claim 10, comprising the additional step of first isolating said virus strain in said continuous-line mammalian kidney cell culture.

12. A method in accordance with claim 11, wherein said virus strain is first isolated and then serially passaged at least five times in Madin Darby Canine Kidney cell culture.

13. A method in accordance with claim 10, wherein said virus strain is Penn/103/70 ATCC VR 666.

14. A method in accordance with claim 12, wherein each passage is incubated at 36°C. for 6 to 7 days.

15. A method in accordance with claim 10, wherein a single freeze-thaw cycle is used to release the virus strain from the cell culture.

16. A method of producing a lyophilized canine tracheobronchitis vaccine comprising the steps of:
  1. first isolating and then serially passaging the canine tracheobronchitis virus strain designated ATCC VR 666, at least five times in Madin Darby Canine Kidney Cell culture, each passage being incubated at 36°C. for 6 to 7 days;
  2. at harvest of the virus strain from said cell culture, adding SPG to a final concentration of 1X SPG and gelatin to a final concentration of 0.5% gelatin, and during propagating of the virus strain adding SPG to a final concentration of 0.1X SPG and gelatin to a final concentration of 0.5% gelatin;
  3. increasing the virus yield by releasing the intracellular virus through a rapid freeze-thaw cycle of said cell culture;
  4. centrifuging the resulting fluid-cell suspension to produce a clarified virus-containing supernatant;
  5. lyophilizing said supernatant;
  6. storing that lyophilizing product at 4°C. until needed for use; and
  7. resuspending said product in an appropriate resuspending medium to obtain said lyophilized vaccine.

17. A method of inducing immunity to canine tracheobronchitis comprising parenterally administering a canine tracheobronchitis vaccine prepared as in claim 1 in sufficient quantities to produce antibodies without causing undesired symptoms of the disease.

18. A method in accordance with claim 17, wherein the vaccine is administered intramuscularly.

19. A method in accordance with claim 17, wherein dosage given of vaccine with a $TCD_{50}$ of $10^{6.7-7.7}$ per milliliter is approximately 2 milliliters per adult animal and 1 milliliter per puppy.

20. A method of inducing immunity to canine tracheobronchitis comprising parenterally administering a canine tracheobronchitis vaccine prepared as in claim 10, in sufficient quantities to produce antibodies without causing undesired symptoms of the disease.

21. A method in accordance with claim 20, wherein the vaccine is administered intramuscularly.

22. A method in accordance with claim 20, wherein the dosage given a vaccine with a $TCD_{50}$ of $10^{6.7-7.7}$ per milliliter of approximately 2 milliliters per adult animal and 1 milliliter per puppy.

23. A method of stabilizing the HA titer and infectivity titer of a virus-containing cell culture comprising the step of adding SPG and gelatin to stabilize said HA titer and said infectivity titer.

24. A method in accordance with claim 23, wherein SPG is added to give a final concentration of 1X SPG and gelatin is added to give a final concentration of 0.5% gelatin for harvest of the virus from said virus-containing cell cultures, and SPG is added to give a final concentration of 0.1X SPG and gelatin is added to give a final concentration of 0.5% gelatin for propagation of said virus-containing cell culture.

25. A method for preserving the infectivity of a virus harvest during lyophilization comprising the step of adding SPG to give a final concentration of 1X SPG and gelatin to give a final concentration of 0.5% gelatin.

* * * * *